(12) United States Patent
Li et al.

(10) Patent No.: US 11,443,034 B2
(45) Date of Patent: Sep. 13, 2022

(54) TRUST ZONE-BASED OPERATING SYSTEM AND METHOD

(71) Applicant: Huawei Technologies Co., Ltd., Shenzhen (CN)

(72) Inventors: Wenhao Li, Shenzhen (CN); Yubin Xia, Shanghai (CN); Haibo Chen, Shanghai (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 94 days.

(21) Appl. No.: 17/037,093

(22) Filed: Sep. 29, 2020

(65) Prior Publication Data

US 2021/0011996 A1 Jan. 14, 2021

Related U.S. Application Data

(63) Continuation of application No. PCT/CN2019/079547, filed on Mar. 25, 2019.

(30) Foreign Application Priority Data

Apr. 2, 2018 (CN) .......................... 201810283482.4

(51) Int. Cl.
*G06F 21/53* (2013.01)
*G06F 9/30* (2018.01)
(Continued)

(52) U.S. Cl.
CPC .......... *G06F 21/53* (2013.01); *G06F 9/30098* (2013.01); *G06F 11/302* (2013.01);
(Continued)

(58) Field of Classification Search
CPC .... G06F 21/53; G06F 9/30098; G06F 11/302; G06F 12/1009; G06F 12/1458;
(Continued)

(56) References Cited

U.S. PATENT DOCUMENTS 9,230,085 B1* 1/2016 Paczkowski ............ G06F 21/57
11,283,606 B2* 3/2022 Zhu ........................ G06F 21/57
(Continued)

FOREIGN PATENT DOCUMENTS

CN 101595500 A 12/2009
CN 103745155 A 4/2014
(Continued)

OTHER PUBLICATIONS

Machiry et al., "BOOMERANG: Exploiting the Semantic Gap in Trusted Execution Environments," NDSS '17, San Diego, CA, USA, pp. 1-15, Internet Society (Feb. 26-Mar. 1, 2017).
(Continued)

*Primary Examiner* — Beemnet W Dada
(74) *Attorney, Agent, or Firm* — Leydig, Voit & Mayer, Ltd.

(57) ABSTRACT

A trust zone-based operating system including a secure world subsystem that runs a trusted execution environment TEE, a TEE monitoring area, and a security switching apparatus is provided. When receiving a sensitive operation request sent by a trusted application TA in the TEE, the TEE writes a sensitive instruction identifier and an operation parameter of the sensitive operation request into a general-purpose register, and sends a switching request to the security switching apparatus. The security switching apparatus receives the switching request, and switches a running environment of the secure world subsystem from the TEE to the TEE monitoring area. The TEE monitoring area stores a sensitive instruction in the operating system. After the running environment is switched, the corresponding first sensitive instruction is called based on the first sensitive instruction identifier, and a corresponding first sensitive operation is performed by using the first sensitive instruction and the first operation parameter.

26 Claims, 4 Drawing Sheets

(51) Int. Cl.
*G06F 11/30* (2006.01)
*G06F 12/1009* (2016.01)
*G06F 12/14* (2006.01)
*G06F 21/57* (2013.01)

(52) U.S. Cl.
CPC ...... *G06F 12/1009* (2013.01); *G06F 12/1458* (2013.01); *G06F 21/57* (2013.01); *G06F 2212/1052* (2013.01); *G06F 2221/2149* (2013.01)

(58) Field of Classification Search
CPC .............. G06F 21/57; G06F 2212/1052; G06F 2221/2149; G06F 21/74; G06F 2221/2105
See application file for complete search history.

(56) References Cited

U.S. PATENT DOCUMENTS

| | | | |
|---|---|---|---|
| 2010/0319001 A1* | 12/2010 | Jones | G06F 9/4411 718/108 |
| 2014/0095918 A1 | 4/2014 | Ståhl et al. | |
| 2018/0068091 A1 | 3/2018 | Gaidar et al. | |
| 2019/0272375 A1* | 9/2019 | Chen | G06F 21/562 |
| 2020/0066809 A1* | 2/2020 | Liu | H01L 27/3234 |
| 2021/0367776 A1* | 11/2021 | Zhu | G06F 21/74 |

FOREIGN PATENT DOCUMENTS

| | | |
|---|---|---|
| CN | 104573565 A | 4/2015 |
| CN | 104809401 A | 7/2015 |
| CN | 105391673 A | 3/2016 |
| CN | 105468980 A | 4/2016 |
| CN | 105528554 A | 4/2016 |
| CN | 105809036 A | 7/2016 |
| CN | 106295385 A | 1/2017 |
| CN | 106778255 A | 5/2017 |
| CN | 107194284 A | 9/2017 |
| WO | 2016187877 A1 | 12/2016 |

OTHER PUBLICATIONS

Azab et al., "Hypervision Across Worlds: Real-time Kernel Protection from the ARM TrustZone Secure World," Computer and Communications Security, New York, USA, CCS'14, XP058060700, pp. 90-102 (Nov. 3, 2014).

* cited by examiner

| TEE's View: Running environment of a trusted execution environment | | TEE-Mon's View: Running environment of a trusted execution environment monitoring area | | REE's View: Running environment of a rich execution environment |
|---|---|---|---|---|
| TEE Data: Trusted execution environment data segment | RWNX: Readable and writable, but unexecutable | TEE Data: Trusted execution environment data segment | RWNX: Readable and writable, but unexecutable | NULL: Mapping is forbidden |
| TEE Code: Trusted execution environment code segment | RX: Readable and executable | TEE Code: Trusted execution environment code segment | RWNX: Readable and writable, but unexecutable | NULL: Mapping is forbidden |
| Gate Data: Security switching apparatus data segment | RWNX: Readable and writable, but unexecutable | Gate Data: Security switching apparatus data segment | RWNX: Readable and writable, but unexecutable | NULL: Mapping is forbidden |
| Gate Code: Security switching apparatus code segment | RX: Readable and executable | Gate Code: Security switching apparatus code segment | RX: Readable and executable | NULL: Mapping is forbidden |
| TEE-Mon Data: Trusted execution environment monitoring area data segment | NULL: Mapping is forbidden | TEE-Mon Data: Trusted execution environment monitoring area data segment | RWNX: Readable and writable, but unexecutable | NULL: Mapping is forbidden |
| TEE-Mon Code: Trusted execution environment monitoring area code segment | NULL: Mapping is forbidden | TEE-Mon Code: Trusted execution environment monitoring area code segment | RX: Readable and executable | NULL: Mapping is forbidden |
| REE Data: Rich execution environment data segment | NULL: Mapping is forbidden | REE Data: Rich execution environment data segment | RWNX: Readable and writable, but unexecutable | RWNX: Readable and writable, but unexecutable |
| REE Code: Rich execution environment code segment | NULL: Mapping is forbidden | REE Code: Rich execution environment code segment | RWNX: Readable and writable, but unexecutable | RX: Readable and executable |
| World Shared Mem: Shared memory | RWNX: Readable and writable, but unexecutable | World Shared Mem: Shared memory | RWNX: Readable and writable, but unexecutable | RWNX: Readable and writable, but unexecutable |

FIG. 2

TRUST ZONE-BASED OPERATING SYSTEM AND METHOD

CROSS-REFERENCE TO RELATED APPLICATIONS

This application is a continuation of International Patent Application No. PCT/CN2019/079547, filed on Mar. 25, 2019, which claims priority to Chinese Patent Application No. 201810283482.4 filed on Apr. 2, 2018. The disclosures of the aforementioned applications are hereby incorporated by reference in their entireties

TECHNICAL FIELD

The present application relates to the field of security technologies, and in particular, to a trust zone-based operating system and method.

BACKGROUND

With rapid development of internet technologies and intelligent terminals, a requirement for a security level of a running environment of an intelligent terminal is increasingly high, and a TrustZone gradually becomes a standard configuration of the intelligent terminal. The TrustZone is a security technology proposed by the ARM Ltd., and the TrustZone introduces a monitoring mode. The monitoring mode is classified into a secure world and a normal world, and a program with a relatively high security level runs in the secure world. The monitoring mode has a highest security level and may be used to switch between the secure world and the normal world. The secure world is completely isolated from the normal world, but all information such as physical memory information in the normal world can be accessed in the secure world. When a terminal device is started, the terminal device first enters the secure world, and then a program in the secure world is responsible for switching to the normal world to start the terminal system.

An environment running in the secure world is usually referred to as a trusted execution environment (TEE), and an environment running in the normal world is usually referred to as a rich execution environment (REE). Generally, the TEE and the REE are also referred to as the Secure World and the Normal World. The TEE has execution space, and has a higher security level than that of a rich operating system (Rich OS). Software and hardware resources that can be accessed by the TEE are separated from the Rich OS. The TEE provides a secure execution environment for authorized security software (Trusted Application, TA), and also protects secrecy, integrity, and access permission of a resource and data of the TA. To ensure a root of trust of the TEE, the TEE needs to pass verification and be isolated from the Rich OS in a secure start process.

With development of the ecosystem, the TEE has become a platform for security-critical application programs, and supports dynamic installation of various trusted applications (TAs). This openness inevitably leads to two problems of the TEE: Higher complexity indicates a larger attack surface; and as a trusted computing base (TCB) in a constructed security model, if the TEE is threatened, security of the entire system is threatened. For example, because the TEE has highest privilege, an attacker may use an error of the TEE to write into an attack referred as a "boomerang" attack, and obtain control permission of the REE. This poses a great threat to security of the REE system. In addition, if the TEE is threatened, the TAs may be further damaged, and important data information such as fingerprint data or a key may be leaked.

SUMMARY

Embodiments of the present application provide a trust zone-based operating system and an operating system start method, to improve security of the system.

According to a first aspect, an embodiment of the present application provides a trust zone-based operating system. The operating system is applied to a terminal device, and the operating system includes a secure world subsystem. A trusted execution environment TEE, a TEE monitoring area, and a security switching apparatus run in the secure world subsystem, and the TEE and the TEE monitoring area are separately connected to the security switching apparatus.

The TEE is configured to: after a first sensitive operation request sent by a trusted application TA in the TEE is received, store, in a general-purpose register, a first sensitive instruction identifier corresponding to the first sensitive operation request and a first operation parameter of the first sensitive operation request, and send a first switching request carrying a first switching identifier to the security switching apparatus. The first switching identifier is used to identify that a running environment of the secure world subsystem needs to be switched from the TEE to the TEE monitoring area.

The security switching apparatus is configured to: receive the first switching request, and switch the running environment of the secure world subsystem from the TEE to the TEE monitoring area according to the first switching request.

The TEE monitoring area is configured to: store a sensitive instruction in the operating system; and after the running environment of the secure module subsystem is switched from the TEE to the TEE monitoring area, read the first sensitive instruction identifier and the first operation parameter from the general-purpose register, call a corresponding first sensitive instruction based on the first sensitive instruction identifier, and perform a corresponding first sensitive operation by using the called first sensitive instruction and the first operation parameter.

In the foregoing method, all sensitive instructions of the operating system are stored in the TEE monitoring area, and sensitive operations that need to be performed by calling these sensitive instructions are used as interfaces to provide services for the TEE. Because the TEE monitoring area separately controls the sensitive instructions of the operating system, the TEE monitoring area obtains a capability of performing security inspection on a sensitive operation before the sensitive operation is performed. This ensures that security inspection on the sensitive operation is not bypassed, and improves security of the sensitive operation of the system. In this way, security of the system is improved.

In a possible design, the TEE is specifically configured to:

search, according to the first sensitive operation request, a preconfigured sensitive instruction identifier table for the first sensitive instruction identifier corresponding to the first sensitive operation request.

The sensitive instruction identifier table is used to store a correspondence between a sensitive operation and a sensitive instruction identifier.

In the foregoing method, the TEE monitoring area can know a sensitive instruction that needs to be called by the TEE.

In a possible design, the security switching apparatus is specifically configured to:

obtain first context information of the TEE monitoring area, and load the first context information; and if second context information is the same as the first context information, determine that a switching environment between the TEE and the monitoring environment is secure. The second context information is information that is obtained after the first context information is loaded and that corresponds to the first context information.

In the foregoing method, it can be indicated that a security attack does not occur in a process of loading the TEE monitoring area.

In a possible design, if the second context information is different from the first context information, the security switching apparatus is further configured to:

exit an operation of switching the running environment of the secure world subsystem from the TEE to the TEE monitoring area.

In the foregoing method, it can be indicated that the security attack occurs in the process of loading the TEE monitoring area.

In a possible design, before performing the corresponding first sensitive operation by using the called first sensitive instruction and the first operation parameter, the TEE monitoring area is further configured to:

perform security inspection on the first sensitive operation according to a preconfigured security inspection policy, and determine that the first sensitive operation passes the security inspection.

In the foregoing method, the TEE monitoring area performs security inspection on the sensitive operation before the sensitive operation is performed. This ensures that security inspection on the sensitive operation is not bypassed, and improves security of the sensitive operation of the system.

In a possible design, the security switching apparatus is further configured to store TEE context information of the TEE after receiving the first switching request.

The TEE monitoring area is further configured to: after the first sensitive operation is performed, store a first operation result of the first sensitive operation in the general-purpose register, and send, to the security switching apparatus, a second switching request carrying a second switching identifier. The second switching identifier is used to identify that a running environment needs to be switched from the TEE monitoring area to the TEE.

The security switching apparatus is further configured to: receive the second switching request, and switch the running environment of the secure world subsystem from the TEE monitoring area to the TEE according to the second switching request and the TEE context information.

The TEE is further configured to: after the running environment of the secure module subsystem is switched from the TEE monitoring area to the TEE, read the first operation result from the general-purpose register.

In the foregoing method, the TEE may be securely switched to based on the TEE context information.

In a possible design, the TEE monitoring area is further configured to: in a stage in which code of the TEE is loaded, perform sensitive instruction inspection on the loaded code of the TEE, to determine that no sensitive instruction exists in the loaded code of the TEE.

In the foregoing method, if it is determined that no sensitive instruction exists in the loaded code of the TEE, it is considered that an attack is not performed on the operating system in a start process. In this way, the code can be normally loaded.

In a possible design, the operating system further includes a normal world subsystem, the normal world subsystem runs a rich execution environment REE, and the REE is connected to the security switching apparatus.

The REE is configured to: receive a TA call request sent by a client application CA in the REE, store a security request parameter of the TA call request in a first shared memory, and send a third switching request carrying a third switching identifier to the security switching apparatus. The first shared memory is a shared memory between the REE and the TEE. The security request parameter includes an identifier of the TA requested for calling. The third switching identifier is used to identify that a running environment needs to be switched from the REE to the TEE.

The security switching apparatus is configured to: receive the third switching request, and switch a running environment of the operating system from the REE to the TEE according to the third switching request.

The TEE is configured to: after the running environment of the operating system is switched from the REE to the TEE, read the security request parameter from the first shared memory, and call the corresponding TA and perform a corresponding operation based on the security request parameter.

In the foregoing method, the switching request identifier is carried in the switching request, so that the security switching apparatus can distinguish to switch the running environment to the TEE.

In a possible design, the REE is configured to: receive a second sensitive operation request sent by the CA in the REE, store a second sensitive instruction identifier corresponding to the second sensitive operation request and a second operation parameter of the second sensitive operation request in a second shared memory, and send a fourth switching request carrying a fourth switching identifier to the security switching apparatus. The fourth switching identifier is used to identify that the running environment of the operating system needs to be switched from the REE to the TEE monitoring area. The second shared memory is a shared memory between the REE and the TEE monitoring area.

The security switching apparatus is configured to: receive the fourth switching request, and switch the running environment of the operating system from the REE to the TEE monitoring area according to the fourth switching request.

The TEE monitoring area is configured to: after the running environment of the operating system is switched from the REE to the TEE monitoring area, read the second sensitive instruction identifier and the second operation parameter from the second shared memory, call a corresponding sensitive instruction based on the second sensitive instruction identifier, and perform a corresponding second sensitive operation by using the called sensitive instruction and the second operation parameter.

In the foregoing method, all of the sensitive instructions of the operating system are stored in the TEE monitoring area, and the TEE monitoring area obtains the capability of performing security inspection on a sensitive operation before the sensitive operation is performed. This ensures security inspection on the sensitive operation of the REE is not bypassed, and improves security of the sensitive operation of the system.

In a possible design, the TEE is specifically configured to:

search, according to the second sensitive operation request, the preconfigured sensitive instruction identifier table for the second sensitive instruction identifier corresponding to the second sensitive operation request.

In a possible design, the security switching apparatus is further configured to store REE context information of the REE after receiving the fourth switching request.

The TEE monitoring area is further configured to: after the second sensitive operation is performed, store a second operation result of the second sensitive operation in the second shared memory, and send a fifth switching request carrying a fifth switching identifier to the security switching apparatus. The fifth switching identifier is used to identify that the running environment needs to be switched from the TEE monitoring area to the REE.

The security switching apparatus is further configured to: receive the fifth switching request, and switch the running environment of the secure world subsystem from the TEE monitoring area to the REE according to the fifth switching request and the REE context information.

The REE is further configured to: after the running environment of the secure module subsystem is switched from the TEE monitoring area to the REE, read the second operation result from the second shared memory.

In the foregoing method, the REE may be securely switched to based on the REE context information.

In a possible design, the TEE monitoring area is further configured to: in a stage in which the operating system starts and initializes, configure the security switching apparatus as a switching mechanism between any two of the TEE, the TEE monitoring area, and the REE, and initialize, in a memory of the terminal device, a first memory page table of the TEE monitoring area, a second memory page table of the TEE, and a third memory page table of the REE. Memory spaces corresponding to the first memory page table, the second memory page table, the third memory page table, and a fourth memory page table of the security switching apparatus are different. The TEE and the REE are forbidden to map the first memory page table, the REE is forbidden to map the first memory page table and the second memory page table, and the REE is forbidden to map the fourth memory page table.

The security switching apparatus is further configured to: in a process of switching a running environment of the operating system, switch a memory page table pointer of the operating system to a memory page table of a corresponding running environment.

In the foregoing method, because the memory spaces corresponding to the first memory page table, the second memory page table, the third memory page table, and the fourth memory page table are different, attacks on the TEE and the TEE monitoring area can be avoided.

In a possible design, the TEE is specifically configured to send the first switching request to the security switching apparatus by calling a secure monitor call SMC instruction.

According to a second aspect, an embodiment of the present application provides a trust zone-based operating method. An operating system to which the method is applied is applied to a mobile device. The operating system includes a secure world subsystem. A trusted execution environment TEE, a TEE monitoring area, and a security switching apparatus run in the secure world subsystem. The TEE and the TEE monitoring area are separately connected to the security switching apparatus. The method includes:

After receiving a first sensitive operation request sent by a trusted application TA in the TEE, the TEE stores, in a general-purpose register, a first sensitive instruction identifier corresponding to the first sensitive operation request and a first operation parameter of the first sensitive operation request, and sends a first switching request carrying a first switching identifier to the security switching apparatus. The first switching identifier is used to identify that a running environment of the secure world subsystem needs to be switched from the TEE to the TEE monitoring area.

The security switching apparatus switches the running environment of the secure world subsystem from the TEE to the TEE monitoring area according to the first switching request.

The TEE monitoring area stores a sensitive instruction in the operating system, and after the running environment of the secure module subsystem is switched from the TEE to the TEE monitoring area, reads the first sensitive instruction identifier and the first operation parameter from the general-purpose register, calls a corresponding first sensitive instruction based on the first sensitive instruction identifier, and performs a corresponding first sensitive operation by using the called first sensitive instruction and the first operation parameter.

In a possible design, the first sensitive instruction identifier is an identifier that corresponds to the first sensitive operation request and that is found in a preconfigured sensitive instruction identifier table according to the first sensitive operation request, where the sensitive instruction identifier table is used to store a correspondence between a sensitive operation and a sensitive instruction identifier.

In a possible design, before the security switching apparatus switches the running environment of the secure world subsystem from the TEE to the TEE monitoring area according to the first switching request, the method further includes:

obtaining first context information of the TEE monitoring area, and loading the first context information; and if second context information is the same as the first context information, determining that a switching environment between the TEE and the monitoring environment is secure. The second context information is information that is obtained after the first context information is loaded and that corresponds to the first context information.

In a possible design, the method further includes:

If the second context information is different from the first context information, the security switching apparatus exits an operation of switching the running environment of the secure world subsystem from the TEE to the TEE monitoring area.

In a possible design, before the TEE monitoring area performs a corresponding first sensitive operation by using the called first sensitive instruction and the first operation parameter, the method further includes:

performing security inspection on the first sensitive operation according to a preconfigured security inspection policy, and determining that the first sensitive operation passes the security inspection.

In a possible design, before the security switching apparatus switches the running environment of the secure world subsystem from the TEE to the TEE monitoring area according to the first switching request, the method further includes:

saving TEE context information of the TEE after receiving the first switching request.

After the TEE monitoring area performs a corresponding first sensitive operation by using the called first sensitive instruction and the first operation parameter, the method further includes:

The TEE monitoring area stores a first operation result of the first sensitive operation in the general-purpose register, and sends a second switching request carrying a second switching identifier to the security switching apparatus. The second switching identifier is used to identify that a running environment needs to be switched from the TEE monitoring area to the TEE.

The security switching apparatus switches the running environment of the secure world subsystem from the TEE monitoring area to the TEE according to the second switching request and the TEE context information.

The TEE reads the first operation result from the general-purpose register.

In a possible design, the method further includes:

The TEE monitoring area performs, in a stage in which code of the TEE is loaded, sensitive instruction inspection on the loaded code of the TEE, to determine that no sensitive instruction exists in the loaded code of the TEE.

In a possible design, the operating system further includes a normal world subsystem, the normal world subsystem runs a rich execution environment REE, and the REE is connected to the security switching apparatus.

The method further includes:

The REE receives a TA call request sent by a client application CA, stores a security request parameter of the TA call request in a first shared memory, and sends a third switching request carrying a third switching identifier to the security switching apparatus. The first shared memory is a shared memory between the REE and the TEE. The security request parameter includes an identifier of the TA requested for calling. The third switching identifier is used to identify that a running environment needs to be switched from the REE to the TEE.

The security switching apparatus switches a running environment of the operating system from the REE to the TEE according to the third switching request.

The TEE is configured to: after the running environment of the operating system is switched from the REE to the TEE, read the security request parameter from the first shared memory, and call the corresponding TA and perform a corresponding operation based on the security request parameter.

In a possible design, the method further includes:

The REE receives a second sensitive operation request sent by the CA in the REE, stores a second sensitive instruction identifier corresponding to the second sensitive operation request and a second operation parameter of the second sensitive operation request in a second shared memory, and sends a fourth switching request carrying a fourth switching identifier to the security switching apparatus. The fourth switching identifier is used to identify that the running environment of the operating system needs to be switched from the REE to the TEE monitoring area, and the second shared memory is a shared memory between the REE and the TEE monitoring area.

The security switching apparatus switches the running environment of the operating system from the REE to the TEE monitoring area according to the fourth switching request.

The TEE monitoring area reads the second sensitive instruction identifier and the second operation parameter from the second shared memory, calls a corresponding sensitive instruction based on the second sensitive instruction identifier, and performs a corresponding second sensitive operation by using the called sensitive instruction and the second operation parameter.

In a possible design, the second sensitive operation identifier is an identifier that corresponds to the second sensitive operation request and that is found in the preconfigured sensitive instruction identifier table according to the second sensitive operation request.

In a possible design, before the security switching apparatus switches the running environment of the operating system from the REE to the TEE monitoring area according to the fourth switching request, the method further includes:

The security switching apparatus saves REE context information of the REE after receiving the fourth switching request.

After the TEE monitoring area performs a corresponding second sensitive operation by using the called sensitive instruction and the second operation parameter, the method further includes:

The TEE monitoring area stores a second operation result of the second sensitive operation in the second shared memory, and sends a fifth switching request carrying a fifth switching identifier to the security switching apparatus. The fifth switching identifier is used to identify that the running environment needs to be switched from the TEE monitoring area to the REE.

The security switching apparatus switches the running environment of the secure world subsystem from the TEE monitoring area to the REE according to the fifth switching request and the REE context information.

The REE reads the second operation result from the second shared memory after the running environment of the secure module subsystem is switched from the TEE monitoring area to the REE.

In a possible design, the method further includes:

The TEE monitoring area configures, in a stage in which the operating system starts and initializes, the security switching apparatus as a switching mechanism between any two of the TEE, the TEE monitoring area, and the REE, and initializes, in a memory of the terminal device, a first memory page table of the TEE monitoring area, a second memory page table of the TEE, and a third memory page table of the REE. Memory spaces corresponding to the first memory page table, the second memory page table, the third memory page table, and a fourth memory page table of the security switching apparatus are different. The TEE and the REE are forbidden to map the first memory page table. The REE is forbidden to map the first memory page table and the second memory page table. The REE is forbidden to map the fourth memory page table.

In a process of switching a running environment of the operating system, the security switching apparatus switches a memory page table pointer of the operating system to a memory page table of a corresponding running environment.

In a possible design, that the TEE sends a first switching request carrying a first switching identifier to the security switching apparatus includes:

sending the first switching request to the security switching apparatus by calling a secure monitor call SMC instruction.

BRIEF DESCRIPTION OF DRAWINGS

FIG. 2 is a schematic diagram of a mapping relationship of a memory page table according to an embodiment of the present application;

DESCRIPTION OF EMBODIMENTS

Figure 1:
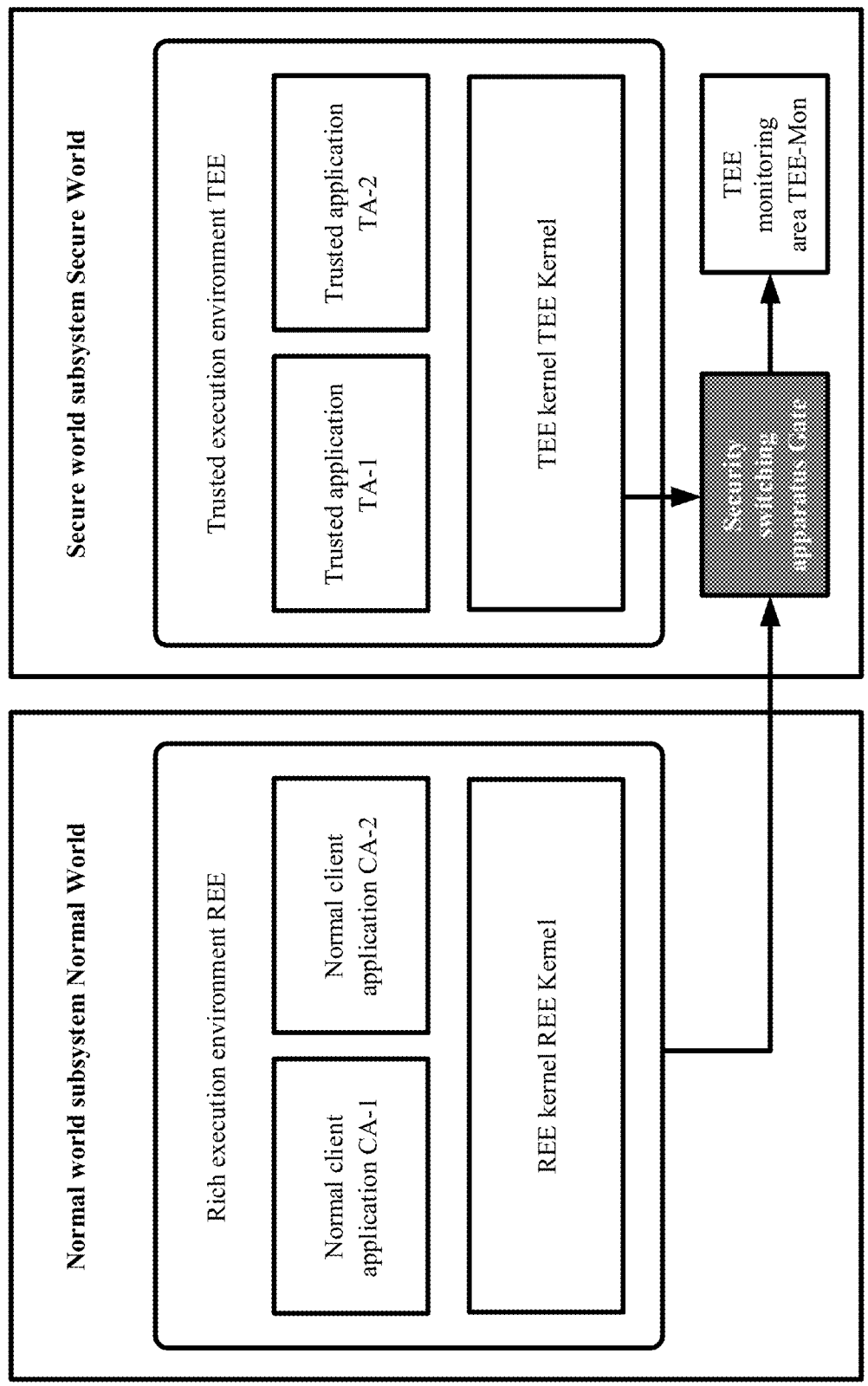
FIG. 1 is a schematic diagram of an architecture of a trust zone-based operating system according to an embodiment of the present application.

FIG. 1 is a schematic diagram of a system architecture of a trust zone-based operating system according to an embodiment of the present application. The operating system may be applied to a terminal device including but not limited to a smartphone. As shown in FIG. 1, the operating system includes a normal world subsystem (Normal World) and a secure world subsystem (Secure World). The Secure World has a security level higher than that of the Normal World. An REE runs in the Normal World, and a TEE, a TEE monitoring area (TEE-Mon), and a security switching apparatus (Gate) run in the Secure World. The REE includes a normal client application (CA) in user space of the Normal World and an REE kernel in kernel space of the Normal World. The TEE includes a trusted application (TA) in user space of the Secure World and a TEE kernel in kernel space of the Secure World.

It can be seen from FIG. 1 that the Secure World has two running environments: a running environment of the TEE and a running environment of the TEE-Mon, and the TEE-Mon and the TEE-Kernel run at a same privilege level. Both switching between the TEE and the TEE-Mon and switching between the TEE and the REE need to be performed by using the Gate, to implement isolation between the TEE and the TEE-Mon. The TEE and TEE-Mon are isolated from each other. Therefore, even if a security vulnerability occurs in the TEE, running of the TEE-Mon is not affected.

In this embodiment of the present application, all sensitive instructions of the operating system are stored in the TEE-Mon, and sensitive operations that need to be performed by calling these sensitive instructions are used as interfaces to provide services for the TEE or the REE. In other words, no sensitive instruction is retained in the TEE, and any sensitive operation (an operation that needs to be performed by calling a sensitive instruction) in the TEE or the REE needs to be completed by the TEE-Mon after the running environment or a running environment of the operating system is switched from the TEE or the REE to the TEE-Mon. Because the TEE-Mon separately controls all of the sensitive instructions of the operating system, the TEE-Mon obtains a capability of performing security inspection on a sensitive operation before the sensitive operation is performed. This ensures that security inspection on the sensitive operation is not bypassed, and improves security of the sensitive operation of the system.

The sensitive instruction refers to an instruction for operating a privileged resource, and generally refers to an operation instruction related to memory management. The sensitive instructions generally include an instruction that attempts to access or modify a virtual machine mode or a machine status, an instruction that attempts to access or modify a sensitive register or a storage unit, an instruction that attempts to access a storage protection system, a memory, or an address allocation system, and all I/O instructions. For example, for security operation requests of devices such as a translate table base register (TTBR), a system control register (SCTLR), a vector base address register (VBAR), a monitor program vector base address register (MVBAR), a memory management unit (MMU), and a coprocessor (CP 15), these operations are related to isolation of a system memory, and therefore are critical to security of the operating system.

According to the operating system in this embodiment of the present application, to further improve isolation between different running environments and reduce a coupling degree between the different running environments, in a stage in which the operating system starts and initializes, the TEE-Mon configures the Gate as a switching apparatus between any two of the TEE, the TEE-Mon, and the REE, and separately configures different memory page tables for the TEE, the TEE-Mon, the Gate, and the REE in a memory of the terminal device. In other words, memory spaces of the TEE, the TEE-Mon, the Gate, and the REE are different from each other. This implements physical isolation between the TEE, the TEE-Mon, the Gate, and the REE, and further improves security of the system.

The Gate is an apparatus configured to complete switching between any two of the TEE, the TEE-Mon, and the REE, to be specific, the Gate is an entrance environment of the TEE, the TEE-Mon, and the REE. Therefore, to ensure security of the entrance environment and avoid a problem that the TEE and/or the TEE-Mon in the Secure World are/is attacked because the entry environment is tampered with, in this embodiment of the present application, lockdown of a translation lookaside buffer (TLB) of a code segment of the Gate is enabled in the stage in which the operating system starts. To be specific, TLB entries corresponding to the Gate are locked down, to ensure that the TLB entries corresponding to the Gate is not modified. To be specific, mapping relationships between virtual addresses and physical addresses corresponding to these TLB entries are not changed. This ensures that a control flow executed by a program to a corresponding virtual address is not changed, and further improves security of the Secure World.

FIG. 2 is a schematic diagram of a memory mapping relationship among an REE, a TEE, and a TEE-Mon according to an embodiment of the present application. The figure separately shows mapping permission of the TEE to memory spaces of the REE, the TEE-Mon, and a Gate, mapping permission of the TEE-mon to memory spaces of the REE, the TEE, and the Gate, and mapping permission of the REE to memory spaces of the TEE, the TEE-Mon, and the Gate. A code segment (Code) and a data segment (Data) of each of the REE, the TEE, the TEE-Mon, and the Gate are further shown in the figure. RX indicates that the code segment and the data segment are readable and executable. RWNX indicates that the code segment and the data segment are readable and writable, but unexecutable. NULL indicates that mapping is forbidden (to be specific, the code segment and the data segment are unreadable, unwritable, and unexecutable). For example, for the TEE, the TEE Data is readable and writable but unexecutable, the TEE Code is executable, but the TEE is forbidden to map a memory page table of the REE.

It can be seen from the figure that, in running environments of the REE, the TEE, and the TEE-Mon, both the REE and the TEE are forbidden to map a physical memory of the TEE-Mon. Even if both the TEE and TEE-Mon run in a Secure World, a memory page table of the TEE-Mon is invisible to the TEE, to further ensure security of the TEE-Mon. To ensure security of the REE, in this embodiment of the present application, memory mapping permission of the TEE for the REE is limited, and the TEE is forbidden to map the memory page table of the REE. The REE runs in a Normal World, and a security level of the Normal World is lower than that of the Secure World. Therefore, a visible memory space of the REE is the smallest. In addition to the code and the data of the REE, a shared memory (World Sharemem) between the REE and TEE, and a shared memory between the REE and TEE-Mon, other shared memory cannot be mapped.

For ease of description, in the following description, the shared memory between the REE and the TEE is referred to as a first shared memory, and the shared memory between the REE and the TEE-Mon is referred to as a second shared memory.

It can be seen from FIG. 2 that, compared with an existing trust zone-based operating system, the TEE in the operating system in this embodiment of the present application is degraded in permission. Although the TEE runs in the Secure World, the TEE cannot access a memory space of the TEE-Mon, and cannot randomly access a memory space of the REE. This greatly reduces impact of a TEE problem on security of the entire Secure World, and also reduces impact of the TEE problem on security of the Normal World.

To enable the TEE to apply to the TEE-Mon for a sensitive operation service, in this embodiment of the present application, a sensitive instruction identifier table needs to be preconfigured in the TEE. The sensitive instruction identifier table is used to store a correspondence between a sensitive operation and a sensitive instruction identifier. When the TEE needs to apply to the TEE-Mon for the sensitive operation service, the TEE may find a corresponding sensitive instruction identifier in the identifier table according to a sensitive operation request, and notify the TEE-Mon of the found sensitive instruction identifier, so that the TEE-Mon knows the sensitive instruction that needs to be called by the TEE.

For the operating system shown in FIG. 1, the TA is authorized security software installed in the TEE. In the TEE, different TAs are independent of each other. If access is not authorized, one TA cannot execute a resource of another TA. The TA obtains access permission of a required security resource and a required service through an internal interface (Internal API) of the TEE. When the TEE Kernel receives an operation request sent by the TA, if the operation request is a non-sensitive operation request, the TEE Kernel may directly call the security resource and the service that are required by the TA in the TEE, to complete the operation request of the TA, and return an operation result to the TA through the Internal API.

If the operation request received by the TEE Kernel from the TA is a sensitive operation request, because a sensitive instruction needs to be called to complete the sensitive operation request, but the TEE Kernel does not have the sensitive instruction, the TEE Kernel cannot complete a sensitive operation, and needs to call a service of the TEE-Mon. In this case, the TEE Kernel first needs to search the sensitive instruction identifier table for a corresponding sensitive instruction identifier according to the sensitive operation request, write the sensitive instruction identifier and an operation parameter in the sensitive operation request into a general-purpose register, and send a switching request to the Gate to request to switch the running environment of the operating system from the TEE to the TEE-Mon.

After receiving the switching request sent by the TEE Kernel, the Gate needs to store context information of the TEE Kernel (referred to as TEE context information for short), so that when the running environment needs to be switched back to the TEE Kernel, the running environment of the TEE Kernel is restored according to the stored TEE context information. To switch the running environment of the operating system from the TEE Kernel to the TEE-Mon, the Gate needs to obtain and load context information of the TEE-Mon. In this case, the Gate obtains the context information of the TEE-Mon from the memory space of the TEE-Mon, to prepare for secure switching of a processor to the TEE-Mon. The Gate loads the obtained context information of the TEE-Mon. The context information mainly refers to a current context environment of a running environment, and usually refers to a status of a register, namely, a value of the register, including current statuses of registers such as the VBAR, the SCTLR, and the TTBR.

To avoid an attack of jumping to the middle of an instruction segment (jump-to-the-middle), it is ensured that the loaded context information of the TEE-Mon is not tampered with during execution. Therefore, after loading the context information of the TEE-Mon, the Gate needs to compare the loaded context information of the TEE-Mon with the original context information of the TEE-Mon (the context information of the TEE-Mon is obtained from the memory space of the TEE-Mon). If the loaded context information of the TEE-Mon and the original context information of the TEE-Mon are consistent, it indicates that no security attack occurs in the process of loading the TEE-Mon, and the Gate switches the running environment from the TEE Kernel to the TEE-Mon. Different running environments correspond to respective memory page tables. Therefore, in a process of switching the running environment from the TEE Kernel to the TEE-Mon, the Gate further needs to switch a memory page table pointer of the operating system to the memory page table of the TEE-Mon, to ensure that the processor can correctly map a virtual address to a physical address based on the memory page table of the TEE-Mon when the operating system runs in the TEE-Mon.

The page table pointer points to a page table memory address of the processor, and the page table pointer is generally a special-purpose register, for example, a TTBR 0 register and a TTBR 1 register in an ARM system architecture, a CR 3 register in an X86 system architecture, a page table pointer register, and the translate table base register.

The TEE-Mon reads the sensitive instruction identifier and the operation parameter from the general-purpose register, calls the corresponding sensitive instruction based on the sensitive instruction identifier, and performs a corresponding sensitive operation by using the called sensitive instruction and the operation parameter. After performing the sensitive operation, the TEE-Mon writes a corresponding operation result back to the general-purpose register, and initiates a switching request to the Gate. After receiving the switching request initiated by the TEE-Mon, the Gate switches the running environment from the TEE-Mon to the TEE according to the stored TEE context information, and switches the memory page table pointer to a memory page table of the TEE. After switching is completed, the TEE Kernel may read the operation result of the sensitive operation request from the general-purpose register.

When the CA in the REE needs to call a sensitive instruction to complete a sensitive operation, after receiving a sensitive operation request sent by the CA, the REE Kernel may first search, according to the sensitive operation request sent by the CA, the preconfigured sensitive instruction identifier table for a sensitive instruction identifier corresponding to the sensitive operation request sent by the CA. Then, the REE Kernel needs to write the sensitive instruction identifier and an operation parameter into the second shared memory between the REE and the TEE-Mon, and initiates a switching request to the TEE-Mon. The TEE-Mon stores context information of the REE Kernel (referred to as REE context information for short), obtains the context information of the TEE-Mon, and when determining that no security attack occurs in a process of loading the context information of the TEE-Mon, switches the running environment to the TEE-Mon. After reading the sensitive instruction identifier and the operation parameter from the second shared memory, the TEE-Mon calls the sensitive instruction to complete the corresponding sensitive operation, writes an operation result back into the second shared memory, and initiates a switching request to the Gate. After the Gate switches the running environment back to the REE, the REE Kernel may read the operation result of the sensitive operation request from the second shared memory.

It should be noted that in the existing trust zone-based operating system, because the sensitive instruction in the operating system is stored in the TEE, when the REE side needs to call the sensitive instruction to complete the sensitive operation, the REE writes, into the shared memory between the REE and the TEE, the sensitive instruction identifier and the corresponding operation parameter that need to be called. After a monitoring mode switches the running environment from the REE to the TEE, the TEE completes the corresponding sensitive operation based on data in the shared memory. In addition, in this embodiment of the present application, all of the sensitive instructions of the operating system are stored in the TEE-Mon isolated from both the REE and the TEE. Therefore, the sensitive operation request used to call the sensitive instruction on the REE side also needs to be completed by the TEE-Mon after being switched to the TEE-Mon by the Gate. Specifically, when the REE Kernel executes the operation request sent by the CA, in a process of executing the operation request, if logical implementation of the operation request includes the sensitive instruction identifier, the REE Kernel writes the sensitive instruction identifier and the corresponding operation parameter into the shared memory between the REE and the TEE-Mon. After the Gate switches the running environment from the REE to the TEE-Mon based on the switching request sent by the REE side, the TEE-Mon obtains related data from the shared memory between the REE and the TEE-Mon, to complete the corresponding sensitive operation.

In this embodiment of the present application, if the CA in the REE needs to call the TA in the TEE to complete a security operation (non-sensitive operation), after receiving a TA call request sent by the CA, the REE writes a security request parameter (including but not limited to an identifier of the TA that needs to be called, parameter information required by the TA to complete the operation, and the like) of the request into the first shared memory, and initiates a switching request to the Gate. The operation corresponding to the switching request is a non-sensitive operation. Therefore, after the Gate switches the running environment from the REE to the TEE, the TEE Kernel calls the corresponding TA based on the security request parameter read from the first shared memory, to complete the corresponding security operation, and initiates, to the Gate, a switching request for switching back to the REE after writing an operation result into the first shared memory. The Gate switches the running environment back to the REE according to stored REE context information, and the REE Kernel may read, from the first shared memory, the operation result corresponding to the TA call request. Similarly, in a process in which the Gate completes switching between different running environments, the Gate needs to switch a memory page table corresponding to the memory page table pointer to a memory page table of a switched running environment.

In this embodiment of the present application, the REE, the TEE, or the TEE-Mon may initiate the switching request of the running environment to the Gate in a secure monitor call (SMC) instruction manner or a hardware interrupt manner.

It can be learned from the foregoing description that, if the switching request initiated by the REE to the Gate is the sensitive operation request that needs to call the sensitive instruction, the Gate needs to switch the running environment from the REE to the TEE-Mon according to the switching request. If the TA in the TEE needs to be called, the Gate needs to switch the running environment from the REE to the TEE according to the switching request. Therefore, to enable the Gate to distinguish whether the running environment is switched to the TEE-Mon or the TEE, different switching request identifiers need to be predefined. When the REE initiates a switching request to the Gate, the switching request carries different switching request identifiers, so that the Gate can distinguish whether to switch the running environment to the TEE-Mon or the TEE. Similarly, when the TEE initiates a switching request to the Gate, the switching request also needs to carry different switching request identifiers, so that the Gate can distinguish whether to switch the running environment to the TEE-Mon or the REE.

It may be understood that, in this embodiment of the present application, implementation of operations in the REE, the TEE, the TEE-Mon, and the Gate is specifically performed by a central processing unit (CPU) of the terminal device. According to switching of the running environment of the operating system, the CPU is in different running environments.

Figure 3:
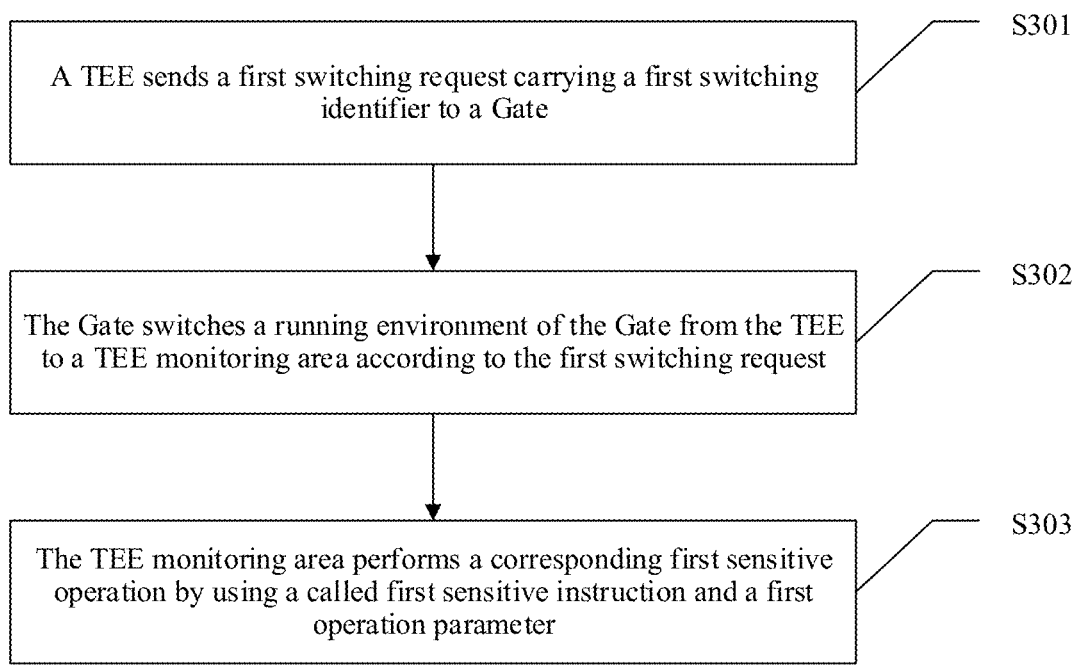
FIG. 3 is a schematic flowchart of a trust zone-based operation method according to an embodiment of the present application.
Figure 4:
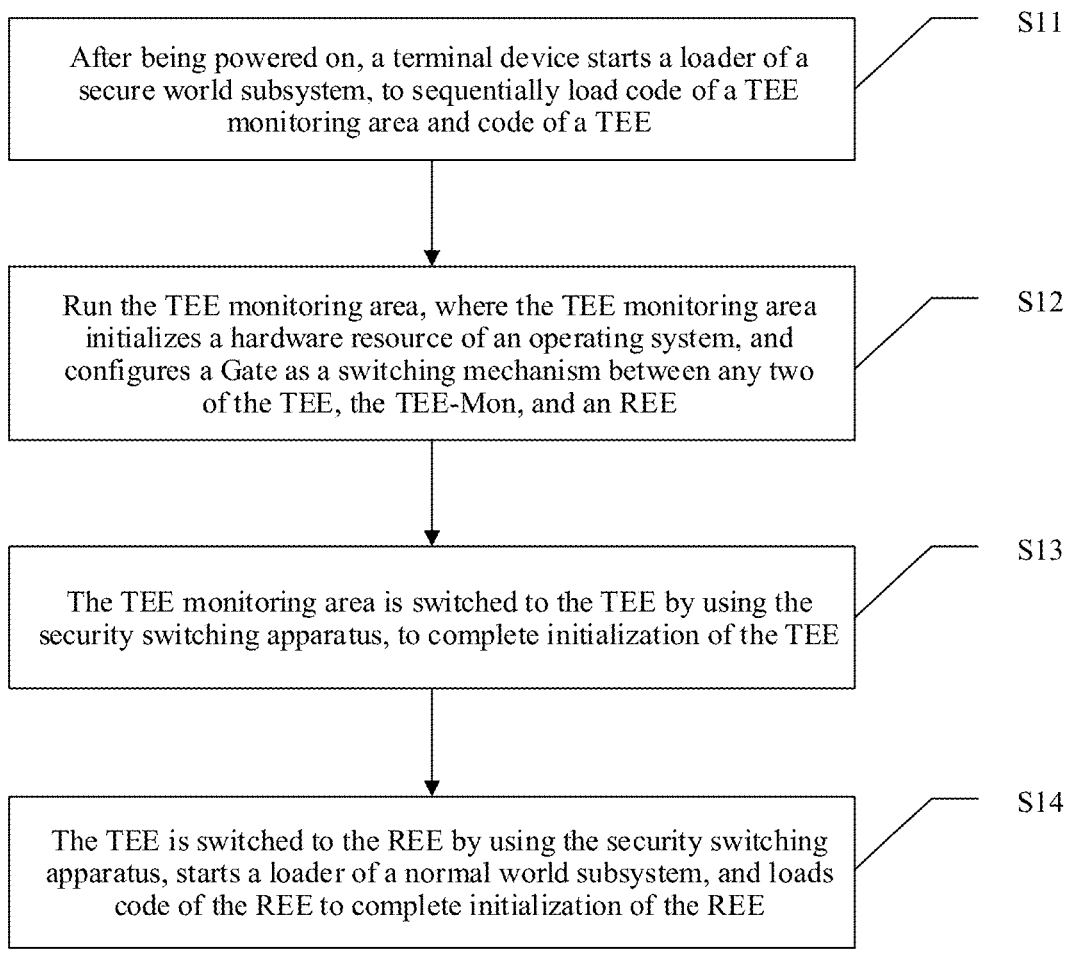
FIG. 4 is a schematic flowchart of a start process of an operating system according to an embodiment of the present application.

Corresponding to the operating system shown in FIG. 1, an embodiment of the present application further provides a trust zone-based operation method. The start method is applied to a terminal device. The operating system includes a secure world subsystem and a normal world subsystem. A trusted execution environment TEE, a TEE-Mon, and a Gate run in the secure world subsystem, and an REE runs in the normal world subsystem. As shown in FIG. 3, the operation method may specifically include the following steps.

S301: The TEE sends a first switching request carrying a first switching identifier to the Gate.

After receiving a first sensitive operation request sent by a TA in the TEE, the TEE stores, in a general-purpose register, a first sensitive instruction identifier corresponding to the first sensitive operation request and a first operation parameter of the first sensitive operation request, and sends the first switching request carrying the first switching identifier to the Gate, where the first switching identifier is used to identify that a running environment of the secure world subsystem needs to be switched from the TEE to the TEE monitoring area.

S302: The Gate switches the running environment of the Gate from the TEE to the TEE monitoring area according to the first switching request.

S303: The TEE monitoring area performs a corresponding first sensitive operation by using a called first sensitive instruction and the first operation parameter.

The TEE monitoring area stores a sensitive instruction in the operating system. After the running environment of the secure module subsystem is switched from the TEE to the TEE monitoring area, the first sensitive instruction identifier and the first operation parameter are read from the general-purpose register, the corresponding first sensitive instruction is called based on the first sensitive instruction identifier, and the corresponding first sensitive operation is performed by using the called first sensitive instruction and the first operation parameter.

In an optional embodiment of the present application, the first sensitive instruction identifier is an identifier that corresponds to the first sensitive operation request and that is found in a preconfigured sensitive instruction identifier table according to the first sensitive operation request. The sensitive instruction identifier table is used to store a correspondence between a sensitive operation and a sensitive instruction identifier.

In an optional embodiment of the present application, before the Gate switches the running environment of the secure world subsystem from the TEE to the TEE monitoring area according to the first switching request, the method further includes:

obtaining first context information of the TEE monitoring area, and loading the first context information; and if second context information is the same as the first context information, determining that a switching environment between the TEE and the monitoring environment is secure, where the second context information is information that is obtained after the first context information is loaded and that corresponds to the first context information.

In an optional embodiment of the present application, if the second context information is different from the first context information, the Gate exits an operation of switching the running environment of the secure world subsystem from the TEE to the TEE monitoring area.

In an optional embodiment of the present application, before the corresponding first sensitive operation is performed by using the called first sensitive instruction and first operation parameter, the method further includes:

performing security inspection on the first sensitive operation according to a preconfigured security inspection policy, and determining that the first sensitive operation passes the security inspection.

In an optional embodiment of the present application, before the Gate switches the running environment of the secure world subsystem from the TEE to the TEE monitoring area according to the first switching request, the method further includes:

saving TEE context information of the TEE after receiving the first switching request.

After the corresponding first sensitive operation is performed by using the called first sensitive instruction and the first operation parameter, the method further includes:

The TEE monitoring area stores a first operation result of the first sensitive operation in the general-purpose register, and sends a second switching request carrying a second switching identifier to the Gate. The second switching identifier is used to identify that a running environment needs to be switched from the TEE monitoring area to the TEE.

The Gate switches the running environment of the secure world subsystem from the TEE monitoring area to the TEE according to the second switching request and the TEE context information.

The TEE reads the first operation result from the general-purpose register.

In an optional embodiment of the present application, the method further includes:

The TEE monitoring area performs, in a stage in which code of the TEE is loaded, sensitive instruction inspection on the loaded code of the TEE, to determine that no sensitive instruction exists in the loaded code of the TEE.

In an optional embodiment of the present application, the operating system further includes a normal world subsystem REE, the REE is connected to the Gate, and the method further includes:

The REE receives, a TA call request sent by a CA, stores a security request parameter of the TA call request in a first shared memory, and sends a third switching request carrying a third switching identifier to the Gate. The first shared memory is a shared memory between the REE and the TEE. The security request parameter includes an identifier of the TA requested for calling. The third switching identifier is used to identify that a running environment needs to be switched from the REE to the TEE.

The Gate switches a running environment of the operating system from the REE to the TEE according to the third switching request.

The TEE is configured to: after the running environment of the operating system is switched from the REE to the TEE, read the security request parameter from the first shared memory, and call the corresponding TA and perform a corresponding operation based on the security request parameter.

In an optional embodiment of the present application, the method further includes:

The REE receives a second sensitive operation request sent by the CA in the REE, stores a second sensitive instruction identifier corresponding to the second sensitive operation request and a second operation parameter of the second sensitive operation request in a second shared memory, and sends a fourth switching request carrying a fourth switching identifier to the Gate. The fourth switching identifier is used to identify that the running environment of the operating system needs to be switched from the REE to the TEE monitoring area, and the second shared memory is a shared memory between the REE and the TEE monitoring area.

The Gate switches the running environment of the operating system from the REE to the TEE monitoring area according to the fourth switching request.

The TEE monitoring area reads the second sensitive instruction identifier and the second operation parameter from the second shared memory, calls a corresponding sensitive instruction based on the second sensitive instruction identifier, and performs a corresponding second sensitive operation by using the called sensitive instruction and the second operation parameter.

In an optional embodiment of the present application, the second sensitive operation identifier is an identifier that corresponds to the second sensitive operation request and that is found in the preconfigured sensitive instruction identifier table according to the second sensitive operation request.

In an optional embodiment of the present application, before the Gate switches the running environment of the operating system from the REE to the TEE monitoring area according to the fourth switching request, the method further includes:

The Gate saves REE context information of the REE after receiving the fourth switching request.

After the corresponding second sensitive operation is performed by using the called sensitive instruction and the second operation parameter, the method further includes:

The TEE monitoring area stores a second operation result of the second sensitive operation in the second shared memory, and sends a fifth switching request carrying a fifth switching identifier to the Gate. The fifth switching identifier is used to identify that the running environment needs to be switched from the TEE monitoring area to the REE.

The Gate switches the running environment of the secure world subsystem from the TEE monitoring area to the REE according to the fifth switching request and the REE context information.

The REE reads the second operation result from the second shared memory after the running environment of the secure module subsystem is switched from the TEE monitoring area to the REE.

In an optional embodiment of the present application, the method further includes:

The TEE monitoring area configures, in a stage in which the operating system starts and initializes, the Gate as a switching mechanism between any two of the TEE, the TEE monitoring area, and the REE, and initializes, in a memory of the terminal device, a first memory page table of the TEE monitoring area, a second memory page table of the TEE, and a third memory page table of the REE. Memory spaces corresponding to the first memory page table, the second memory page table, the third memory page table, and a fourth memory page table of the Gate are different from each other. The TEE and the REE are forbidden to map the first memory page table, the REE is forbidden to map the first memory page table and the second memory page table, and the REE is forbidden to map the fourth memory page table.

The Gate switches, in a process of switching a running environment of the operating system, a memory page table pointer of the operating system to a memory page table of a corresponding running environment.

In an example, a specific start process includes the following steps.

Step S11: After being powered on, the terminal device starts a loader (Bootloader) of the secure world subsystem, to sequentially load code of the TEE monitoring area and code of the TEE.

In an optional embodiment of the present application, to ensure that all of the sensitive instructions of the operating system are not loaded to the TEE, when the code of the TEE is loaded, the start method may further include:

When the code of the TEE is loaded, the TEE-Mon performs sensitive instruction inspection on the loaded code of the TEE, to determine that no sensitive instruction exists in the loaded code of the TEE.

If the TEE monitoring area determines that a sensitive instruction exists in the loaded code of the TEE, it is considered that an attack on the operating system exists in the start process, and starting of the operating system needs to be stopped.

It may be understood that, in a process of loading the code of the TEE monitoring area and the code of the TEE, the loaded code further needs to be verified. If verification succeeds, recording continues. If verification fails, the start process is stopped. In the start process of the operating system, specific implementation of performing security inspection on the recorded code exists in the prior art, and methods of performing security inspection on the recorded code generally may include but are not limited to a method of performing security inspection on the recorded code by using a Hash value of the recorded code, and a method of performing security inspection on the recorded code by using a signature of the recorded code.

Step S12: Run the TEE monitoring area, where the TEE monitoring area initializes a hardware resource of the operating system, and configures the Gate as the switching mechanism between any two of the TEE, the TEE-Mon, and the REE.

In this embodiment of the present application, switching between any two of the TEE, the TEE-Mon, and the REE is performed depending on the security switching apparatus, to be specific, the Gate is an entrance environment of the TEE, the TEE-Mon, and the REE. To ensure security of the entrance environment and avoid a problem that the TEE and/or the TEE-Mon in the Secure World are/is attacked because the entry environment is tampered with, TLB entries of a code segment of the Gate are locked down in the start process of the operating system, so that mapping relationships between virtual addresses and physical addresses corresponding to these TLB entries cannot be changed. This ensures that a control flow executed by a program to a corresponding virtual address is not changed, and further improves security of the secure subsystem. In an example, a TLB is initialized, and TLB entries corresponding to a data segment and a code segment of the security switching apparatus in the TLB are locked down.

Step S13: The TEE monitoring area is switched to the TEE by using the security switching apparatus, to complete initialization of the TEE.

Step S14: The TEE is switched to the REE by using the security switching apparatus, starts a loader of the normal world subsystem, and loads code of the REE to complete initialization of the REE.

According to the operating system start method in this embodiment of the present application, after being powered on, the system is started from the TEE-Mon of the secure world subsystem. In this way, key data of the operating system can be detected before the TEE and the REE are started, and security of code of a next level is verified by code of a previous level that is first loaded. This ensures security of code in each stage.

In an optional embodiment of the present application, the sending the first switching request carrying the first switching identifier to the Gate includes: sending the first switching request to the Gate by calling an SMC instruction.

All or some of the foregoing embodiments may be implemented by using software, hardware, firmware, or any combination thereof. When software is used to implement the embodiments, the embodiments may be implemented all or partially in a form of a computer program product. The computer program product includes one or more computer instructions. When the computer program instructions are loaded and executed on a computer, the procedure or functions according to the embodiments of the present application are all or partially generated. The computer may be a general-purpose computer, a special-purpose computer, a computer network, or another programmable apparatus. The computer instructions may be stored in a computer-readable storage medium or may be transmitted from a computer-readable storage medium to another computer-readable storage medium. For example, the computer instructions may be transmitted from a website, computer, server, or data center to another website, computer, server, or data center in a wired (for example, a coaxial cable, an optical fiber, or a digital subscriber line (DSL)) or wireless (for example, infrared, radio, or microwave) manner. The computer-readable storage medium may be any usable medium accessible by a computer, or a data storage device, such as a server or a data center, integrating one or more usable media. The usable medium may be a magnetic medium (for example, a floppy disk, a hard disk, or a magnetic tape), an optical medium (for example, a DVD), a semiconductor medium (for example, a solid-state drive Solid State Disk (SSD)), or the like.

What is claimed is:

1. A trust zone-based operating system applied to a terminal device, comprising:

a secure world subsystem;
a trusted execution environment (TEE) configured to:
  after a first sensitive operation request sent by a trusted application TA in the TEE is received, store, in a general-purpose register, a first sensitive instruction identifier corresponding to the first sensitive operation request and a first operation parameter of the first sensitive operation request, and send a first switching request carrying a first switching identifier to the security switching apparatus, wherein the first switching identifier is used to identify that a running environment of the secure world subsystem needs to be switched from the TEE to the TEE monitoring area;
a TEE monitoring area configured to:
  store a sensitive instruction in the operating system; after the running environment of the secure module subsystem is switched from the TEE to the TEE monitoring area, read the first sensitive instruction identifier and the first operation parameter from the general-purpose register, call a corresponding first sensitive instruction based on the first sensitive instruction identifier, and perform a corresponding first sensitive operation by using the called first sensitive instruction and the first operation parameter; and
a security switching apparatus run in the secure world subsystem configured to:
  receive the first switching request, and switch the running environment of the secure world subsystem from the TEE to the TEE monitoring area according to the first switching request,
wherein the TEE and the TEE monitoring area are separately connected to the security switching apparatus.

2. The operating system according to claim 1, wherein the TEE is further configured to:
  search, according to the first sensitive operation request, a preconfigured sensitive instruction identifier table for the first sensitive instruction identifier corresponding to the first sensitive operation request,
  wherein the sensitive instruction identifier table is used to store a correspondence between a sensitive operation and a sensitive instruction identifier.

3. The operating system according to claim 1, wherein the security switching apparatus is further configured to:
  obtain first context information of the TEE monitoring area, and load the first context information; and
  in response to second context information being the same as the first context information, determine that a switching environment between the TEE and the monitoring environment is secure, wherein the second context information is information that is obtained after the first context information is loaded and that corresponds to the first context information.

4. The operating system according to claim 3, wherein if the second context information is different from the first context information, the security switching apparatus is further configured to:
  exit an operation of switching the running environment of the secure world subsystem from the TEE to the TEE monitoring area.

5. The operating system according to claim 1, wherein before performing the corresponding first sensitive operation by using the called first sensitive instruction and the first operation parameter, the TEE monitoring area is further configured to:
  perform security inspection on the first sensitive operation according to a preconfigured security inspection policy; and
  determine that the first sensitive operation passes the security inspection.

6. The operating system according to claim 1, wherein:
the security switching apparatus is further configured to:
  store TEE context information of the TEE after receiving the first switching request;
the TEE monitoring area is further configured to:
  after the first sensitive operation is performed, store a first operation result of the first sensitive operation in the general-purpose register, and send, to the security switching apparatus, a second switching request carrying a second switching identifier, wherein the second switching identifier is used to identify that a running environment needs to be switched from the TEE monitoring area to the TEE;
the security switching apparatus is further configured to:
  receive the second switching request, and switch the running environment of the secure world subsystem from the TEE monitoring area to the TEE according to the second switching request and the TEE context information; and
the TEE is further configured to:
  after the running environment of the secure module subsystem is switched from the TEE monitoring area to the TEE, read the first operation result from the general-purpose register.

7. The operating system according to claim 1, wherein the TEE monitoring area is further configured to:
  in a stage in which code of the TEE is loaded, perform sensitive instruction inspection on the loaded code of the TEE to determine that no sensitive instruction exists in the loaded code of the TEE.

8. The operating system according to claim 1, wherein the operating system further comprises a normal world subsystem, the normal world subsystem runs a rich execution environment (REE), and the REE is connected to the security switching apparatus, wherein:
the REE is configured to:
  receive a TA call request sent by a client application (CA) in the REE;
  store a security request parameter of the TA call request in a first shared memory;
  send a third switching request carrying a third switching identifier to the security switching apparatus, wherein the first shared memory is a shared memory between the REE and the TEE, the security request parameter comprises an identifier of the TA requested for calling, and the third switching identifier is used to identify that a running environment needs to be switched from the REE to the TEE;
the security switching apparatus is further configured to:
  receive the third switching request, and switch a running environment of the operating system from the REE to the TEE according to the third switching request; and
the TEE is further configured to:
  after the running environment of the operating system is switched from the REE to the TEE, read the security request parameter from the first shared memory, and call the corresponding TA and perform a corresponding operation based on the security request parameter.

9. The operating system according to claim 8, wherein:
the REE is further configured to:

receive a second sensitive operation request sent by the CA in the REE;

store a second sensitive instruction identifier corresponding to the second sensitive operation request and a second operation parameter of the second sensitive operation request in a second shared memory;

send a fourth switching request carrying a fourth switching identifier to the security switching apparatus, wherein the fourth switching identifier is used to identify that the running environment of the operating system needs to be switched from the REE to the TEE monitoring area, and the second shared memory is a shared memory between the REE and the TEE monitoring area;

the security switching apparatus is configured to:

receive the fourth switching request, and switch the running environment of the operating system from the REE to the TEE monitoring area according to the fourth switching request; and the TEE monitoring area is configured to:

after the running environment of the operating system is switched from the REE to the TEE monitoring area, read the second sensitive instruction identifier and the second operation parameter from the second shared memory, call a corresponding sensitive instruction based on the second sensitive instruction identifier, and perform a corresponding second sensitive operation by using the called sensitive instruction and the second operation parameter.

10. The operating system according to claim 9, wherein the TEE is further configured to:

search, according to the second sensitive operation request, the preconfigured sensitive instruction identifier table for the second sensitive instruction identifier corresponding to the second sensitive operation request.

11. The operating system according to claim 9, wherein:

the security switching apparatus is further configured:

to store REE context information of the REE after receiving the fourth switching request;

the TEE monitoring area is further configured to:

after the second sensitive operation is performed, store a second operation result of the second sensitive operation in the second shared memory, and send a fifth switching request carrying a fifth switching identifier to the security switching apparatus, wherein the fifth switching identifier is used to identify that the running environment needs to be switched from the TEE monitoring area to the REE;

the security switching apparatus is further configured to:

receive the fifth switching request, and switch the running environment of the secure world subsystem from the TEE monitoring area to the REE according to the fifth switching request and the REE context information; and the REE is further configured to:

after the running environment of the secure module subsystem is switched from the TEE monitoring area to the REE, read the second operation result from the second shared memory.

12. The operating system according to claim 7, wherein:

the TEE monitoring area is further configured to:

in a stage in which the operating system starts and initializes, configure the security switching apparatus as a switching mechanism between any two of the TEE, the TEE monitoring area, and the REE, and initialize, in a memory of the terminal device, a first memory page table of the TEE monitoring area, a second memory page table of the TEE, and a third memory page table of the REE, wherein memory spaces corresponding to the first memory page table, the second memory page table, the third memory page table, and a fourth memory page table of the security switching apparatus are different, the TEE and the REE are forbidden to map the first memory page table, the REE is forbidden to map the first memory page table and the second memory page table, and the REE is forbidden to map the fourth memory page table; and the security switching apparatus is further configured to:

in a process of switching a running environment of the operating system, switch a memory page table pointer of the operating system to a memory page table of a corresponding running environment.

13. The operating system according to claim 1, wherein the TEE is further configured to:

send the first switching request to the security switching apparatus by calling a secure monitor call (SMC) instruction.

14. A trust zone-based operation method, wherein an operating system to which the method is applied is stored on a mobile device, the operating system comprises a secure world subsystem, a trusted execution environment (TEE), a TEE monitoring area, and a security switching apparatus run in the secure world subsystem, the TEE and the TEE monitoring area are separately connected to the security switching apparatus, and the method comprises:

after receiving a first sensitive operation request sent by a trusted application (TA) in the TEE, storing, by the TEE, in a general-purpose register, a first sensitive instruction identifier corresponding to the first sensitive operation request and a first operation parameter of the first sensitive operation request, and sending a first switching request carrying a first switching identifier to the security switching apparatus, wherein the first switching identifier is used to identify that a running environment of the secure world subsystem needs to be switched from the TEE to the TEE monitoring area;

switching, by the security switching apparatus, the running environment of the secure world subsystem from the TEE to the TEE monitoring area according to the first switching request; and storing, by the TEE monitoring area, a sensitive instruction in the operating system; and after the running environment of the secure module subsystem is switched from the TEE to the TEE monitoring area, reading the first sensitive instruction identifier and the first operation parameter from the general-purpose register, calling a corresponding first sensitive instruction based on the first sensitive instruction identifier, and performing a corresponding first sensitive operation by using the called first sensitive instruction and the first operation parameter.

15. The trust zone-based operation method according to claim 14, wherein the first sensitive instruction identifier is an identifier that corresponds to the first sensitive operation request and that is found in a preconfigured sensitive instruction identifier table according to the first sensitive operation request, wherein:

the sensitive instruction identifier table is used to store a correspondence between a sensitive operation and a sensitive instruction identifier.

16. The trust zone-based operation method according to claim 14, wherein before the switching, by the security switching apparatus, the running environment of the secure world subsystem from the TEE to the TEE monitoring area according to the first switching request, the method further comprises:
obtaining first context information of the TEE monitoring area, and loading the first context information; and
in response to second context information being the same as the first context information, determining that a switching environment between the TEE and the monitoring environment is secure, wherein the second context information is information that is obtained after the first context information is loaded and that corresponds to the first context information.

17. The trust zone-based operation method according to claim 16, wherein the method further comprises:
in response to the second context information being different from the first context information,
exiting, by the security switching apparatus, an operation of switching the running environment of the secure world subsystem from the TEE to the TEE monitoring area.

18. The trust zone-based operation method according to claim 14, wherein before the performing a corresponding first sensitive operation by using the called first sensitive instruction and the first operation parameter, the method further comprises:
performing security inspection on the first sensitive operation according to a preconfigured security inspection policy; and
determining that the first sensitive operation passes the security inspection.

19. The trust zone-based operation method according to claim 14, wherein before the switching, by the security switching apparatus, the running environment of the secure world subsystem from the TEE to the TEE monitoring area according to the first switching request, the method further comprises:
saving TEE context information of the TEE after receiving the first switching request; and
after the performing a corresponding first sensitive operation by using the called first sensitive instruction and the first operation parameter, storing, by the TEE monitoring area, a first operation result of the first sensitive operation in the general-purpose register, and sending a second switching request carrying a second switching identifier to the security switching apparatus, wherein the second switching identifier is used to identify that a running environment needs to be switched from the TEE monitoring area to the TEE;
switching, by the security switching apparatus, the running environment of the secure world subsystem from the TEE monitoring area to the TEE according to the second switching request and the TEE context information; and
reading, by the TEE, the first operation result from the general-purpose register.

20. The trust zone-based operation method according to claim 14, wherein the method further comprises:
performing, by the TEE monitoring area in a stage in which code of the TEE is loaded, sensitive instruction inspection on the loaded code of the TEE to determine that no sensitive instruction exists in the loaded code of the TEE.

21. The trust zone-based operation method according to claim 14, wherein the operating system further comprises a normal world subsystem, the normal world subsystem runs a rich execution environment (REE), and the REE is connected to the security switching apparatus, the method further comprises:
receiving, by the REE, a TA call request sent by a client application (CA), storing a security request parameter of the TA call request in a first shared memory, and sending a third switching request carrying a third switching identifier to the security switching apparatus, wherein the first shared memory is a shared memory between the REE and the TEE, the security request parameter comprises an identifier of the TA requested for calling, and the third switching identifier is used to identify that a running environment needs to be switched from the REE to the TEE;
switching, by the security switching apparatus, a running environment of the operating system from the REE to the TEE according to the third switching request; and
after the running environment of the operating system is switched from the REE to the TEE, read the security request parameter from the first shared memory, and call the corresponding TA and perform a corresponding operation based on the security request parameter.

22. The trust zone-based operation method according to claim 21, wherein the method further comprises:
receiving, by the REE, a second sensitive operation request sent by the CA in the REE, storing a second sensitive instruction identifier corresponding to the second sensitive operation request and a second operation parameter of the second sensitive operation request in a second shared memory, and sending a fourth switching request carrying a fourth switching identifier to the security switching apparatus, wherein the fourth switching identifier is used to identify that the running environment of the operating system needs to be switched from the REE to the TEE monitoring area, and the second shared memory is a shared memory between the REE and the TEE monitoring area;
switching, by the security switching apparatus, the running environment of the operating system from the REE to the TEE monitoring area according to the fourth switching request; and
reading, by the TEE monitoring area, the second sensitive instruction identifier and the second operation parameter from the second shared memory, calling a corresponding sensitive instruction based on the second sensitive instruction identifier, and performing a corresponding second sensitive operation by using the called sensitive instruction and the second operation parameter.

23. The trust zone-based operation method according to claim 22, wherein the second sensitive operation identifier is an identifier that corresponds to the second sensitive operation request and that is found in the preconfigured sensitive instruction identifier table according to the second sensitive operation request.

24. The trust zone-based operation method according to claim 22, wherein before the switching, by the security switching apparatus, the running environment of the operating system from the REE to the TEE monitoring area according to the fourth switching request, the method further comprises:
saving, by the security switching apparatus, REE context information of the REE after receiving the fourth switching request;
after the performing a corresponding second sensitive operation by using the called sensitive instruction and the second operation parameter, storing, by the TEE monitoring area, a second operation result of the second sensitive operation in the second shared memory, and sending a fifth switching request carrying a fifth switching identifier to the security switching apparatus, wherein the fifth switching identifier is used to identify that the running environment needs to be switched from the TEE monitoring area to the REE;

switching, by the security switching apparatus, the running environment of the secure world subsystem from the TEE monitoring area to the REE according to the fifth switching request and the REE context information; and reading, by the REE, the second operation result from the second shared memory after the running environment of the secure module subsystem is switched from the TEE monitoring area to the REE.

25. The trust zone-based operation method according to claim 21, wherein the method further comprises:

configuring, by the TEE monitoring area in a stage in which the operating system starts and initializes, the security switching apparatus as a switching mechanism between any two of the TEE, the TEE monitoring area, and the REE, and initializing, in a memory of the terminal device, a first memory page table of the TEE monitoring area, a second memory page table of the TEE, and a third memory page table of the REE, wherein memory spaces corresponding to the first memory page table, the second memory page table, the third memory page table, and a fourth memory page table of the security switching apparatus are different, the TEE and the REE are forbidden to map the first memory page table, the REE is forbidden to map the first memory page table and the second memory page table, and the REE is forbidden to map the fourth memory page table; and in a process of switching a running environment of the operating system, switching, by the security switching apparatus, a memory page table pointer of the operating system to a memory page table of a corresponding running environment.

26. The trust zone-based operation method according to claim 14, wherein the sending a first switching request carrying a first switching identifier to the security switching apparatus comprises:

sending the first switching request to the security switching apparatus by calling a secure monitor call (SMC) instruction.

\* \* \* \* \*

UNITED STATES PATENT AND TRADEMARK OFFICE
CERTIFICATE OF CORRECTION

PATENT NO. : 11,443,034 B2
APPLICATION NO. : 17/037093
DATED : September 13, 2022
INVENTOR(S) : Li et al.

It is certified that error appears in the above-identified patent and that said Letters Patent is hereby corrected as shown below:

In the Claims

Claim 1: Column 19, Line 4: "application TA in the TEE is received, store, in a" should read -- application (TA) in the TEE is received, store, in a --.

Signed and Sealed this
Thirty-first Day of January, 2023

*Katherine Kelly Vidal*
*Director of the United States Patent and Trademark Office*